(12) United States Patent
Wang et al.

(10) Patent No.: US 9,671,996 B2
(45) Date of Patent: Jun. 6, 2017

(54) MIRROR DISPLAY SYSTEM AND MIRROR DISPLAY METHOD

(71) Applicant: Awind Inc., New Taipei (TW)

(72) Inventors: Yen-Hsiang Wang, New Taipei (TW); Kuan-Yu Chou, New Taipei (TW); Cheng-Hsiung Chang, New Taipei (TW); Shih-Pin Liu, New Taipei (TW)

(73) Assignee: AWIND INC., New Taipei (TW)

( * ) Notice: Subject to any disclaimer, the term of this patent is extended or adjusted under 35 U.S.C. 154(b) by 35 days.

(21) Appl. No.: 14/834,930

(22) Filed: Aug. 25, 2015

(65) Prior Publication Data

US 2016/0124701 A1  May 5, 2016

(30) Foreign Application Priority Data

Nov. 5, 2014 (TW) .............................. 103138454 A

(51) Int. Cl.
*G06F 3/14* (2006.01)
*G06T 3/40* (2006.01)
(Continued)

(52) U.S. Cl.
CPC .......... *G06F 3/1462* (2013.01); *G06F 3/1431* (2013.01); *G06F 3/1454* (2013.01);
(Continued)

(58) Field of Classification Search
CPC .... G06F 3/1462; G06F 3/1431; G06F 3/1454; G06T 3/4092; G09G 5/006; G09G 5/14;
(Continued)

(56) References Cited

U.S. PATENT DOCUMENTS 8,745,509 B2 * 6/2014 Itahana ................. G06F 1/1645
345/619
9,282,287 B1 * 3/2016 Marsh ..................... H04N 7/152
(Continued)

FOREIGN PATENT DOCUMENTS

| CN | 101673185 A | 3/2010 |
|---|---|---|
| CN | 102375718 A | 3/2012 |
| CN | 103518182 A | 1/2014 |

OTHER PUBLICATIONS

The office action of the corresponding Taiwan patent application No. 103138454.
(Continued)

*Primary Examiner* — Jennifer Mehmood
*Assistant Examiner* — Sardis F Azongha
(74) *Attorney, Agent, or Firm* — Chun-Ming Shih; HDLS IPR Services

(57) ABSTRACT

A mirror display system and a mirror display method are present. The mirror display system comprises a transporting device and a receiving device. The mirror display method comprises following steps of: establishing a network connection with a receiving device at the transporting device; loading a plurality of contents; transforming the plurality of contents into a plurality of display data; transporting the plurality of display data to the receiving device via network; merging the plurality of display data into an output display data at the receiving device; transporting the output display data to a display unit for displaying. This application allows user to watch current screens of execution of the contents of the transporting device via a single display unit.

20 Claims, 6 Drawing Sheets

(51) Int. Cl.
*G09G 5/00* (2006.01)
*G09G 5/14* (2006.01)
*G09G 5/395* (2006.01)

(52) U.S. Cl.
CPC ........... *G06T 3/4092* (2013.01); *G09G 5/006* (2013.01); *G09G 5/14* (2013.01); *G09G 5/395* (2013.01); *G09G 2340/045* (2013.01); *G09G 2340/0492* (2013.01); *G09G 2340/10* (2013.01); *G09G 2360/02* (2013.01); *G09G 2360/04* (2013.01); *G09G 2370/04* (2013.01); *G09G 2370/042* (2013.01); *G09G 2370/16* (2013.01)

(58) Field of Classification Search
CPC ... G09G 5/395; G09G 3/2096; H04N 21/2343
See application file for complete search history.

(56) References Cited

U.S. PATENT DOCUMENTS

| | | | |
|---|---|---|---|
| 2013/0204930 A1* | 8/2013 | Hobby | H04L 65/60 709/203 |
| 2015/0179130 A1* | 6/2015 | Smadi | G09G 5/006 345/520 |
| 2015/0189338 A1* | 7/2015 | Lam | H04N 21/234327 725/110 |

OTHER PUBLICATIONS

Office Action Dated Mar. 18, 2016 of the Corresponding Taiwan Patent Application No. 104133778.

* cited by examiner

MIRROR DISPLAY SYSTEM AND MIRROR DISPLAY METHOD

BACKGROUND OF THE INVENTION

Field of the Invention

The present disclosed example relates to a display system and a display method, in particular relates to a mirror display system and a mirror display method.

Description of Related Art

With the rapid development of technology, a variety of mobile devices are provided. Humans can easily use various services anywhere, such as browsing the web, editing the document, watching movies or talking via instant messaging.

However, the mobile devices are often equipped with only a display of small size due to the considerations of convenience and power consumption. When a user uses above-mentioned services via the mobile device, the user can't clearly watch all detail of the screen because the size of display is too small. Moreover, the vision of the user will deteriorate after watching the small size of display for a long time.

For solving the above-mentioned problems, a mirror display system had been provided. Please refer to FIG. 1, which illustrates a schematic diagram for an application of a mirror display system according to the related art. As shown in FIG. 1, a mirror display system 1 of the related art comprises a mobile device 10 and a display device 14.

The mobile device 10 can simultaneously execute a plurality of contents (such as a plurality of application program 100-106), and display a screen 1000 of execution of one of the contents on a touchscreen 12 of the mobile device 10, and make the other application programs 102-106 execute in the background.

The following description will explain how the mirror display system 1 of the related art provides the mirror display service to the user. After the mobile device 10 establishes a connection with the display device 14, the mobile device 10 can continuously transport the screen 1000 of execution of the application program 100 to the display device 14. Then the display device 14 displays the received screen 1000 of execution on a display screen 16. Thus, the user can directly watch the screen 1000 of execution of the application program 100 of the mobile device 10 in the bigger-sized display screen 16.

However, the mirror display system 1 of the related art can only display the current screen 1000 of execution in a manner of mirror, and have no capability of simultaneously displaying the screen of execution of the other application programs 102-106 executing in the background. In other words, the mirror display system 1 of the related art can't help the user to simultaneously use two or more services respectively provided by the two or more application programs (such as seeing the movie and simultaneously talking via instant messaging).

Therefore, there is a need to find out a better and more effective solution to handle such problems existed in the mirror display system of the related art.

SUMMARY OF THE INVENTION

The object of the present disclosed example is to provide a mirror display system and a mirror display method in order to simultaneously display the screens of execution of a plurality of contents.

In order to achieve the above-mentioned objective, the present disclosed example provides a mirror display system, comprising:
a transporting device, comprising:
a transporting element;
a memory element storing a plurality of contents; and
a processing element electrically connected to the transporting element and the memory element loading and transforming the plurality of contents into a plurality of display data, and transporting the plurality of display data to outside via the transporting element, wherein the plurality of display data respectively corresponds to the screens of execution of the plurality of contents; and
a receiving device, comprising:
a transporting unit;
a processing unit electrically connected to the transporting unit merging the plurality of display data into an output display data, and transporting the output display data to a display unit for displaying.

The present disclosed example further provides a mirror display method being used in a mirror display system, the mirror display system comprising a transporting device and a receiving device, the mirror display method comprising following steps: a) establishing a network connection with a receiving device at the transporting device; b) loading a plurality of contents; c) transforming the plurality of contents into a plurality of display data, wherein the plurality of display data respectively corresponds to the screens of execution of the plurality of contents; d) transporting the plurality of display data to the receiving device via network; e) merging the plurality of display data into an output display data at the receiving device; and f) transporting the output display data to a display unit for displaying.

The present disclosed example can effectively allow user to simultaneously watch the screens of execution of the plurality of contents of the transporting device on the single display unit via simultaneously transferring the current screens of execution of the plurality of contents executed by the single transporting device to the receiving end device and simultaneously displaying the pictures on the display unit of the receiving end device.

BRIEF DESCRIPTION OF DRAWING

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

DETAILED DESCRIPTION OF THE INVENTION

In cooperation with the attached drawings, the technical contents and detailed description of the present disclosed example are described thereinafter according to a preferable embodiment, being not used to limit its executing scope. Any equivalent variation and modification made according to appended claims is all covered by the claims claimed by the present disclosed example.

In the following description, a preferred embodiment is explained with associated drawings.

Figure 1:
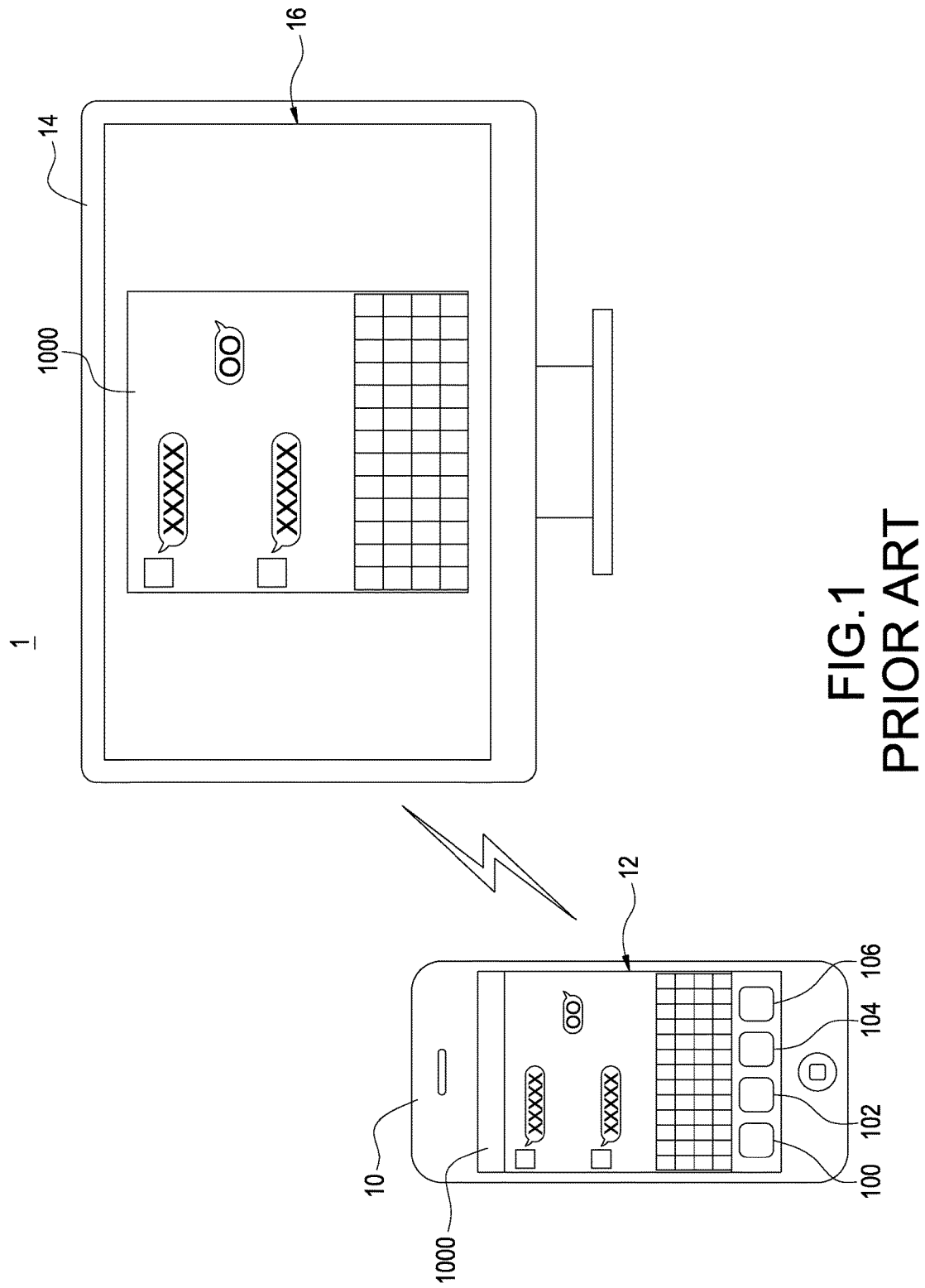
FIG. 1 is a schematic diagram of a mirror display system according to the related art.
Figure 2:
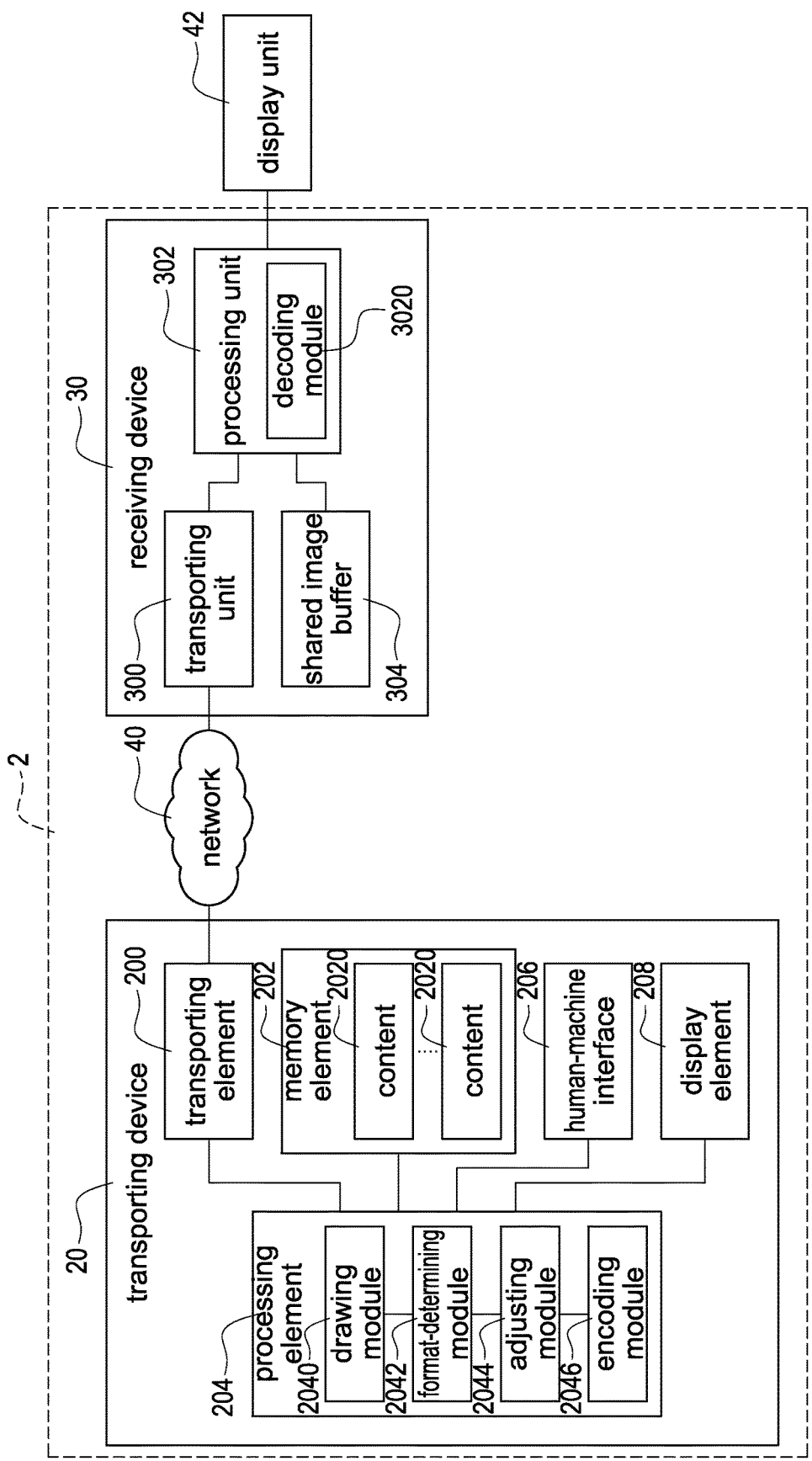
FIG. 2 is an architecture diagram of a mirror display system according to a first embodiment of the present disclosed example.

First, please refer to FIG. 2, which illustrates an architecture diagram of a mirror display system according to a first embodiment of the present disclosed example. As shown in FIG. 2, a mirror display system 2 of the embodiment mainly comprises a transporting device 20 and a receiving device 30. The transporting device 20 connects to the receiving device 30 via a network 40.

The transporting device 20 comprises a transporting element 200, a memory element 202 and a processing element 204. The processing element 204 is electrically connected to the transporting element 200 and the memory element 202. Preferably, the transporting device 20 is smart phone, tablet or wearable computer, but this specific example is not intended to limit the scope of the disclosed example.

The receiving device 30 comprises a transporting unit 300 and a processing unit 302. The processing unit 302 is electrically connected to the transporting unit 300 and an external display unit 42. Preferably, the receiving device 30 is TV box, set-top box, media player or PC, but this specific example is not intended to limit the scope of the disclosed example.

In another embodiment of the disclosed example, the receiving device 30 is a control box installed in a display, and the receiving device 30 is connected to the display unit 42 installed in the same display via internal wiring.

The transporting element 200 can transport data to outside via network. More specifically, the transporting element 200 can establish a network connection with the receiving device 30 via the network 40 for transporting a plurality of display data to the transporting unit 300 (described later). Preferably, the transporting element 200 is Wi-Fi wireless network transceiver, Bluetooth wireless network transceiver or Zigbee wireless network transceiver, the network 40 is Wi-Fi wireless network, Wi-Fi direct wireless network, Bluetooth wireless network or Zigbee wireless network, but this specific example is not intended to limit the scope of the disclosed example.

The memory element 202 stores a plurality of contents 2020. More specifically, the plurality of contents 2020 is stored in the memory element 202 in a form of electronic data. Preferably, the plurality of contents 2020 is the computer files, the computer programs or the multimedia data streams, but this specific example is not intended to limit the scope of the disclosed example.

The processing element 204 can load the plurality of contents 2020 from the memory element 202, respectively transform the plurality of contents 2020 into the plurality of display data, and transport the plurality of display data to the receiving device 30 for displaying the plurality of display data on the display unit 42 in a manner of mirror via the transporting element 200. Preferably, the plurality of display data is respectively corresponded to the screens of execution of the plurality of contents 2020.

For example, if the content 2020 is the computer file, such as text file (such as the computer file having the filename extension ".txt" or ".doc"), image file (such as the computer file having the filename extension ".jpeg", ".psd" or ".png") or audio/video file (such as the computer file having the filename extension ".avi" or ".rmvb"). When the processing element 204 want to load the content 2020, the processing element 204 can first execute a application program supplying the computer file, then load and execute the computer file via the application program. Finally, the processing element 204 images the screen of the result of execution/load generated by the application program executing/loading the computer file to obtain the display data corresponding to the screen of execution of the computer file.

If the content 2020 is the computer program, the processing element 204 executes the computer program, and images the screen of result of execution for obtaining the display data corresponding to the screen of execution of the computer program.

If the content 2020 is the multimedia data stream, the processing element 204 can decode the multimedia data stream, and image the decoded multimedia data stream for obtaining the display data corresponding to the screen of the multimedia data stream.

Preferably, the plurality of display data is video data (such as the video data complying with the H.264 standard) or image data (such as the image data complying with the JPEG (Joint Photographic Experts Group) standard), but this specific example is not intended to limit the scope of the disclosed example.

The following description will explain how the receiving device 30 simultaneously displays the plurality of display data on the display unit 42.

The transporting unit 300 of the receiving device 30 can receive data via network. More specifically, the transporting unit 300 can establish the network connection with the transporting element 200 of the transporting device 20 via the network 40 for receiving the plurality of display data. Preferably, the transporting unit 300 is Wi-Fi wireless network transceiver, Bluetooth wireless network transceiver or Zigbee wireless network transceiver, but this specific example is not intended to limit the scope of the disclosed example.

The processing unit 302 receives the plurality of display data via the transporting unit 300, merges the plurality of display data into an output display data, and transports the output display data to the display unit 42 for displaying. More specifically, the processing unit 302 computes a real display position and a real display range of each display data, and merges all the display data into the single output display data according to the real display position and the real display rang of each display data. Finally, the processing unit transports the output display data to the display unit 42 for displaying.

In another embodiment of the disclosed example, the transporting device 20 further comprises a human-machine interface 206 (such as touchscreen, keyboard or mouse) electrically connected to the processing element 204. The human-machine interface 206 is used to accept an external operation from a user. The processing element 204 configures an arrangement data according to the external operation, and simultaneously transports the plurality of display data and the arrangement data to the receiving device 30 via the transporting element 200 for leading the receiving device 30 to arrange the plurality of display data into the output display data according to the arrangement data. Preferably, the arrangement data comprises an expected display position and an expected display range of each display data in the display unit 42.

In other words, in this embodiment, the user can configure the real display position and the real display range of each display data in the display unit 42 via operating the human-machine interface 206. Thus, the user can freely configure the arrangement of the plurality of contents 2020 in the display unit 42 according to use requirement.

In another embodiment of the disclosed example, the receiving device 30 further comprises a shared image buffer 304 electrically connected to the processing unit 302, the shared image buffer 304 is used to help the receiving device 30 to merge the plurality of display data into the output display data, the specifically description is described below.

The processing unit 302 determines the real display position and the real display range of each display data in the display unit 42 according to the arrangement data received from the transporting device 20. More specifically, if the processing unit 302 determines that arranging the plurality of display data according to the arrangement data won't cause any error (for example, all or portion of any display data won't be covered by the other display data, or all or portion of any display data won't exceed the displayable range of the display unit 42), the processing unit 302 directly configures the real display position and the real display range of each display data for the expected display position and the expected display range; if the processing unit 302 determines that arranging the plurality of display data according to the arrangement data will cause the error (for example, all or portion of any display data will be covered by the other display data, or all or portion of any display data will exceed the displayable range of the display unit 42), the processing unit 302 directly adjusts the real display position and the real display range of each display data.

Then, the processing unit 302 stores each display data in the different address of the shared image buffer 304 so as to merge the plurality of display data into the output display data according to the real display position and the real display range of each display data. Please be noted that the shared image buffer 304 comprises a plurality of memory blocks, and each memory block is respectively corresponded to a display frame of the display unit 42. For example, if the shared image buffer 304 comprises 60 memory blocks, the shared image buffer 304 can simultaneously store 60 display frames.

The processing unit 302 respectively stores each display data in the different address of the same shared image buffer 304 so as to merge the plurality of display data into the output display data. Additionally, the processing unit 302 transports the plurality of the display data (i.e., the merged output display data) stored in the same memory block to the display unit 42 for leading the display unit 42 to make the output display data as the display frame and display.

The present disclosed example can efficiently and fast merge the plurality of the display data into the output display data corresponding to the single display frame via storing the plurality of display data in same memory block of the same shared image buffer 304.

In another embodiment of the disclosed example, the processing element 204 of the transporting device 20 comprises a drawing module 2040 for drawing a view corresponding to the specific content 2020. More specifically, the drawing module 2040 images the screen of the result of load/execution/decode of the content 2020 for drawing the view corresponding to the content 2020. And in some cases, the drawing module 2040 directly makes the view as the display data corresponding to the content 2020 (described later).

Furthermore, when the processing element 204 determines that the drawing module 2040 doesn't support drawing the view corresponding to the content 2020, the processing element 204 transforms the content 2020 into a display image via a plugin program or a third party program as the display data corresponding to the content 2020. When the processing element 204 determines that the drawing module 2040 supports the content 2020, the processing element 204 draws the view of the screen of execution corresponding to the content 2020 via the drawing module 2040.

In another embodiment of the disclosed example, the transporting device 20 further comprises a display element 208 electrically connected to the processing element 204. The processing element 204 directly captures a current displayed screen of the display element 208 as the display data corresponding to the content 2020 when determining that the display element 208 has displayed the view. More specifically, the content 2020 corresponding to the displayed view is the same as that the content being executing in the top layer by the transporting device 20. The content 2020 corresponding to the un-displayed view is the same as that the content being executing in the background by the transporting device 20.

Even the content 2020 is executed in the background (i.e., the screen of execution of the content 2020 isn't displayed on the display element 208), the present disclosed example can effectively retrieve the screen of execution of the content 2020 via using the drawing module 2040 to draw the view corresponding to the content 2020.

In another embodiment of the disclosed example, the processing element 204 further comprises a format-determining module for determining whether the receiving device 30 supports a data format of the content 2020. The processing element 204 directly makes the content 2020 itself as the display data when the display element 208 doesn't display the view and the format-determining module 2042 determines that the receiving device 30 supports the data format of the content 2020. Additionally, the processing element 204 makes the view as the display data corresponding to the content 2020 when the display element 208 doesn't display the view and the format-determining module 2042 determines that the receiving device 30 doesn't support the data format of the content.

For example, if the data format of the content 2020 is the image file of JPEG, and the receiving device 30 can support to load the image file of JPEG, the format-determining module 2042 can determine that the receiving device 30 supports the data format of the content 2020. In this case, the processing element 204 can directly make the content 2020 itself as the display data, and transport the display data to the receiving device 30, rather than transport the view corresponding to the content 2020.

In another embodiment of the disclosed example, the processing element 204 further comprises an adjusting module 2044 for adjusting a display range or a display scale of the plurality of display data.

In another embodiment of the disclosed example, the processing element 204 of the transporting device 20 further comprises an encoding module 2046 for executing an encoding process to the plurality of display data. The processing unit 302 of the receiving device 30 comprises a decoding module 3020 for executing a decoding process to the plurality of display data. Preferably, the encoding process is a data-format-transforming process, a compressing process or an encrypting process; the decoding process is a decompressing process or a decrypting process.

Please be noted that the encoding module 2046 can respectively transform the data format of the plurality of display data into the data format being supportable by the receiving device 30.

Please note that the drawing module 2040, the format-determining module 2042, the adjusting module 2044, the encoding module 2046 and the decoding module 3020 may be implemented by hardware modules like electronic circuit or integrated circuit with recorded digital circuits, or implemented by software modules, e.g. Application Programming Interface (API), but are not limited to aforementioned examples.

Figure 3:
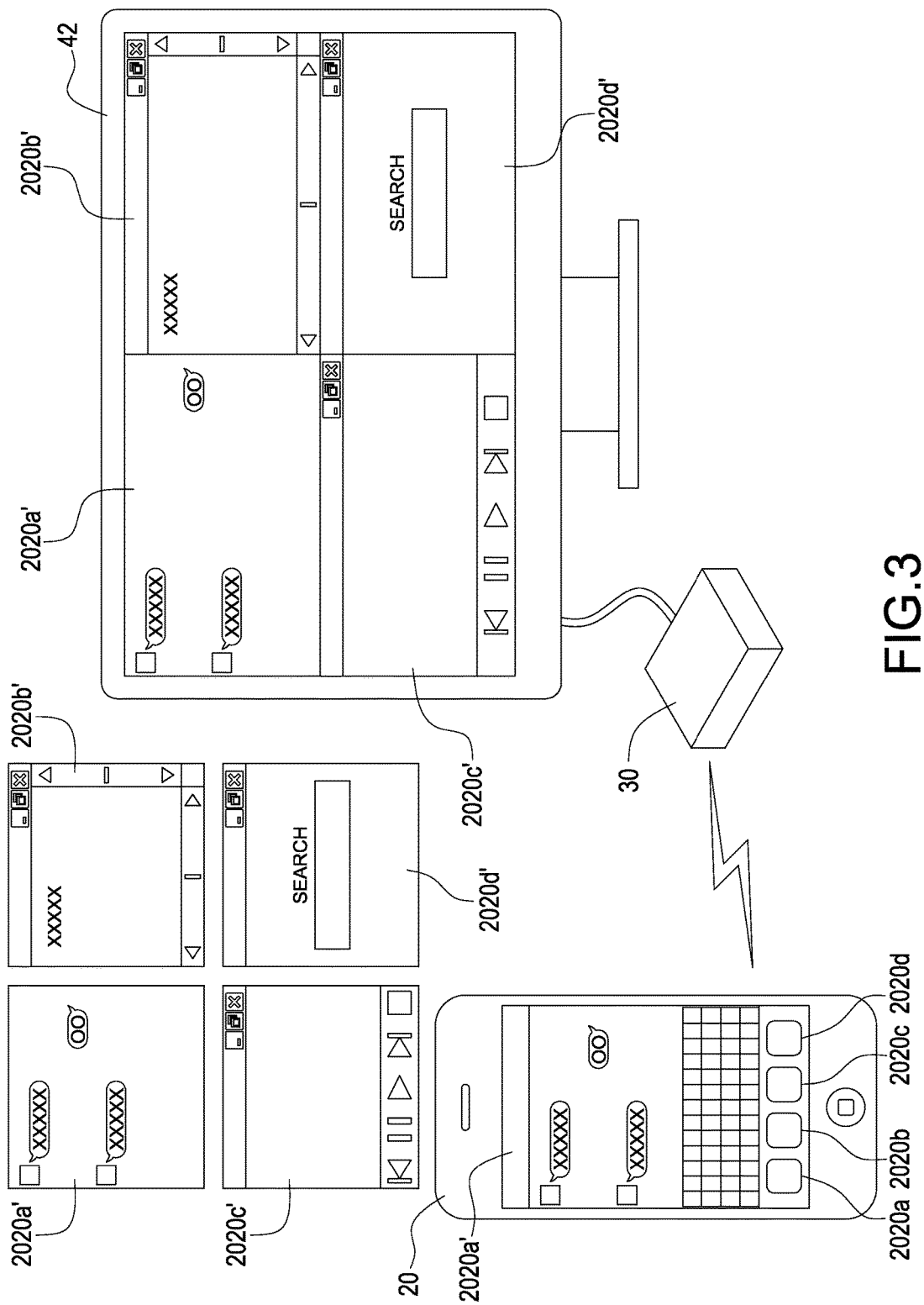
FIG. 3 is a schematic diagram of a mirror display system according to a first embodiment of the present disclosed example.

Please refer to FIG. 3, which illustrates a schematic diagram of a mirror display system according to a first embodiment of the present disclosed example. FIG. 3 is used to explain how the mirror display system 1 of this embodiment simultaneously displays the screens of execution of the plurality of contents 2020 on the display unit 42.

As shown in FIG. 3, in this embodiment, the transporting device 20 is exemplified to be the smart phone, the plurality of contents 2020 are exemplified to be the different computer programs 2020a-2020d (the computer program 2020a is an instant messaging program, the computer program 2020b is a document-editing program, the computer program 2020c is a multimedia player program, the computer program 2020d is web browser program), the receiving device 30 is exemplified to be the TV box.

The transporting device 20 can simultaneously execute the computer programs 2020a-2020d, and respectively draw the views 2020a'-2020d' corresponding to the screens of execution of the computer programs 2020a-2020d. Additionally, the transporting device 20 can only display the view 200a' corresponding to the computer program 2020a, and can't simultaneously display the views 2020b'-2020d' corresponding to the computer programs 2020b-2020d executed in the background.

After the transporting device 20 establishes the network connection with the receiving device 30, the transporting device 20 makes the view 2020a'-2020d' as the plurality of display data, and transports the plurality of display data to the receiving device 30.

The receiving device 30 merges the plurality of display data into the single output display data, and transports the output display data to the display unit 42 for displaying. Thus, the user can simultaneously acquire the information about the screens of execution of the computer programs 200a-2020d via watching the display unit 42. Furthermore, the user can simultaneously use the different services provided by the computer programs 2020a-2020d (such as seeing the movie and simultaneously talking via instant messaging).

Please be noted that, although this embodiment is to simultaneously display the current screens of execution of the 4 computer programs 2020a-2020d in a form of 4 picture division, but this specific example is not intended to limit the scope of the disclosed example. People having ordinary skill in the art of the present disclosed example can freely modify the number (e.g., 3 screens, 6 screens or 8 screens) and the arrangement (e.g., overlap displaying, vertical alignment displaying or horizontally arranged displaying) of the screen (s) of execution displayed on the display unit 42 according to requirement.

Figure 4:
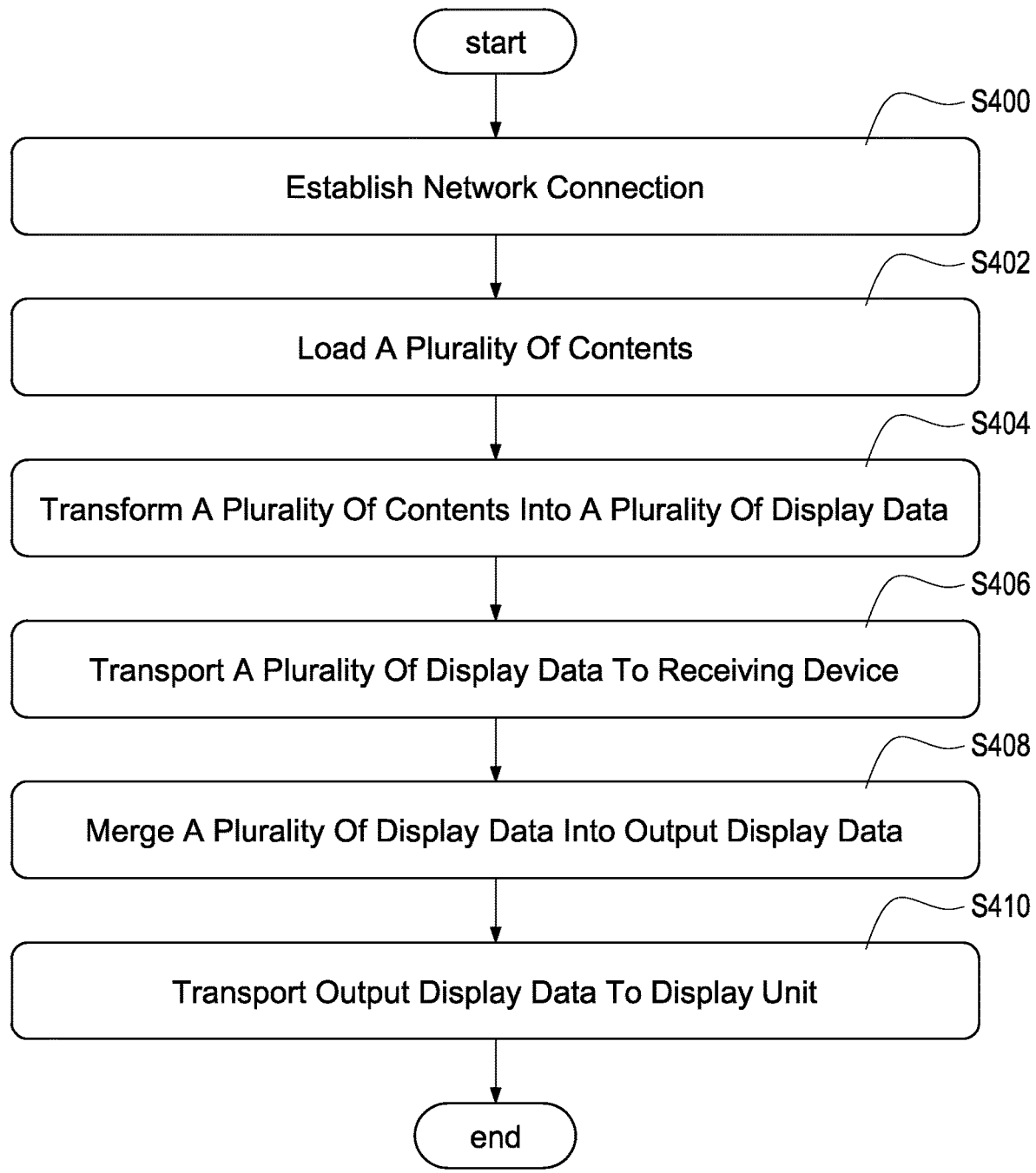
FIG. 4 is a flowchart of a mirror display method according to a first embodiment of the present disclosed example.

Please refer to FIG. 4, which illustrates a flowchart of a mirror display method according to a first embodiment of the present disclosed example. The mirror display method in this embodiment is mainly implemented by the mirror display system 2 as illustrated in FIG. 2.

Step S400: establishing the network connection. More specifically, the transporting device 20 establishes the network connection with the receiving device via the network 40.

Step S402: loading the plurality of contents 2020. More specifically, the processing element 204 of the transporting device 20 loads the plurality of contents 2020 from the memory element 202. Preferably, the plurality of contents 2020 can be computer files, computer programs or multimedia data streams, but this specific example is not intended to limit the scope of the disclosed example.

Step S404: transforming the plurality of contents 2020 into the plurality of display data. More specifically, the transporting device 20 transforms the plurality of contents 2020 into the plurality of display data. Preferably, the plurality of display data respectively corresponds to the screens of execution of the plurality of contents 2020.

Step S406: transporting the plurality of display data to the receiving device 30. More specifically, the transporting device 20 transports the plurality of display data retrieved in the step S404 to the receiving device 30 via the network connection.

Step S408: merging the plurality of display data into the output display data. More specifically, the receiving device 30 merges the plurality of display data retrieved in the step S406 into the single output display data so as to display the plurality of display data on the single display unit 42. Preferably, the transporting device 30 can compute the real display position and the real display range of each display data, and store each display data in the different address of the shared image buffer 304 for merging the plurality of display data into the output display data according to the real display position and the real display range of each display data.

Step S410: transporting the output display data to the display unit 42. More specifically, the transporting device 30 transports the output display data to the display unit 42 for displaying via wire/wireless.

Figure 5:
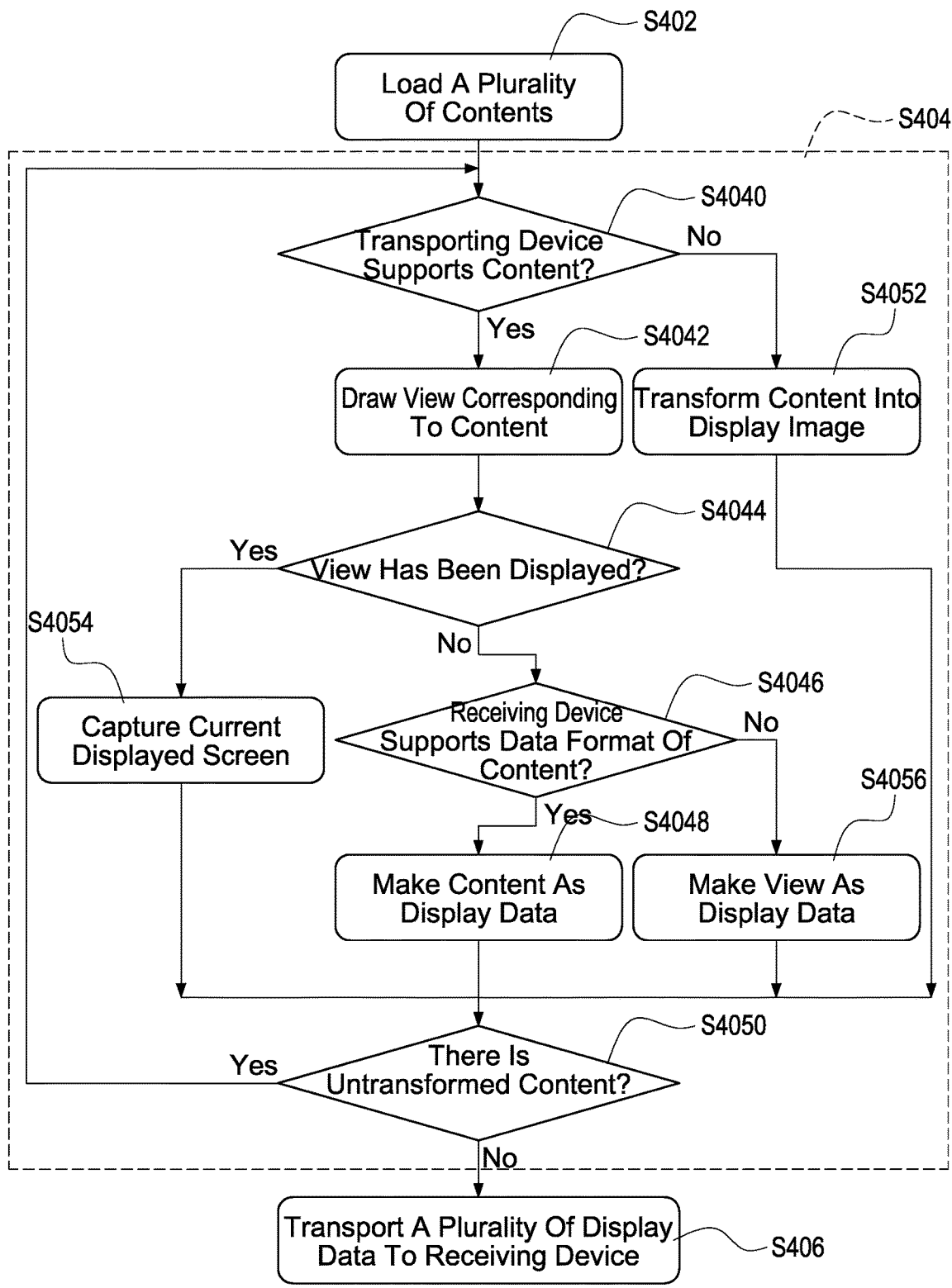
FIG. 5 is a detailed flowchart of step S404 of FIG. 4.

Please refer to FIG. 5, which illustrates a detailed flowchart of step S404 of FIG. 4. FIG. 5 is used to specifically explain how to transform the plurality of contents 2020 into the plurality of display data.

Step S4040: determining whether the transporting device 20 support the content 2010. More specifically, the transporting device 20 retrieves one of the contents 2020, and determines whether the drawing module 2040 supports drawing the view corresponding to the content 2020. The transporting device 20 performs a step 4052 when determining that the drawing module 2040 doesn't support drawing the view corresponding to the content 2020; the transporting device 20 performs a step 4042 when determining that the drawing module 2040 supports drawing the view corresponding to the content 2020.

Step S4042: drawing the view corresponding to the content 2020. More specifically, the transporting device 20 draws the view corresponding to the content 2020 via the drawing module 2040. Furthermore, the drawing module 2040 is to image the screen of load/execution/decode of the content 2020 so as to draw the view corresponding to content 2020.

Step S4044: determining whether the view has been displayed. More specifically, the transporting device 20 determines whether the view corresponding to the content 2020 has been displayed on the display element 208. If the transporting device 20 determines that the view has been displayed on the display element 208, performs a step 4054; if the transporting device 20 determines that the view doesn't have been displayed on the display element 208, performs a step 4046.

Step S4046: determining whether the receiving device 30 supports the data format of the content 2020. More specifically, the transporting device 20 determines whether the receiving device 30 supports the data format of the content 2020 via the format-determining module 2042. If the transporting device 20 determines that the receiving device 30 supports the data format of the content 2020, performs a step 4048. If the transporting device 20 determines that the receiving device 30 doesn't support the data format of the content 2020, performs a step 4056.

Step S4048: making the content 2020 as the display data. More specifically, because the receiving device 30 can support the data format of the content 2020, the transporting device 20 can directly make the content 2020 itself as the display data.

For example, if the data format of the content 2020 is the image file of JPEG, and the receiving device 30 supports loading the image file of JPEG, the format-determining module 2042 can determine that the receiving device 30 supports the data format of the content 2020. In this case, the processing element 204 can directly make the content 2020 itself as the display data, and transport the display data to the receiving device 30, rather than transport the view corresponding to the content 2020.

Step S4050: determining whether there is any untransformed content. More specifically, the transporting device 20 determines whether all the plurality of contents 2020 which the user wants to display have been transformed into the plurality of display data. If the transporting device 20 determines that there is any content 2020 not transformed into the display data, repeatedly performs the step 4040 for transforming the content 2020 into the display data. If the transporting device 20 determines that all the contents 2020 have been transformed into the display data, performs the step 406.

If the transporting device 20 determines that the content 2020 is not supported in the step S4040, performs the step 4052.

Step 4052: transforming the content 2020 into the display image. More specifically, the transporting device 20 transforms the content 2020 into the display image via the plugin program or the third party program as the display data corresponding to the content 2020.

If the transporting device 20 determines that the view has been displayed on the display element 208 in the step S4044, performs the step 4054.

Step S4054: capturing the current displayed screen. More specifically, the transporting device 20 directly captures the screen currently displayed on the display element 208 as the display data corresponding to the content 2020.

If the transporting device 20 determines that the receiving device 30 doesn't support the data format of the content 2020 in the step S4046, performs the step 4056.

Step S4056: making the view as the display data. More specifically, the transporting device 20 directly makes the view as the display data of the content 2020.

Figure 6:
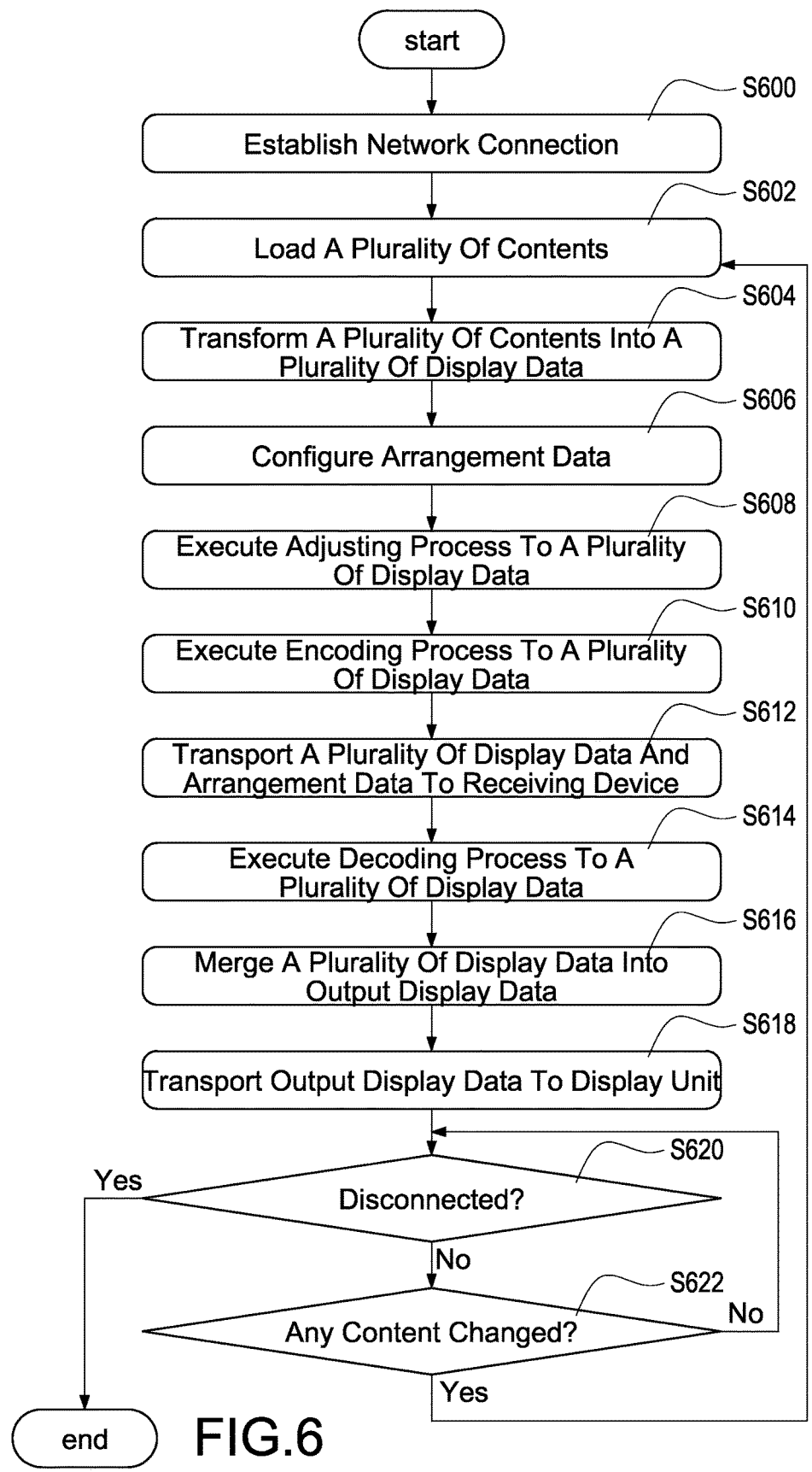
FIG. 6 is a flowchart of a mirror display method according to a second embodiment of the present disclosed example.

Please refer to FIG. 6, which illustrates a flowchart of a mirror display method according to a second embodiment of the present disclosed example. The mirror display method in this embodiment is mainly implemented by the mirror display system 2 as illustrated in FIG. 2.

Step S600: establishing the network connection.

Step S602: loading the plurality of contents 2020.

Step S604: transforming the plurality of contents 2020 into the plurality of display data. More specifically, the transporting device 20 transforms the plurality of contents 2020 retrieved in the step S602 into the plurality of display data.

Step S606: configuring the arrangement data. More specifically, the transporting device 20 accepts the user operation via the human-machine interface so as to configuring the arrangement data. In which the arrangement data comprises the expected display position and the expected display range of each display data in the display unit 42 which the user expected.

In another embodiment of the disclosed example, the transporting device 20 can be configured to disable from accepting the user operation, and the transporting device 20 computes the arrangement data by itself (above-mentioned description comprise computing the expected display position and the expected display range by itself).

Step S608: executing the adjusting process to the plurality of display data. More specifically, the transporting device 20 executes the adjusting process to the plurality of display data via the adjusting module 2044. Preferably, the adjusting process is to adjust the display range or the display scale of the plurality of the display data, but this specific example is not intended to limit the scope of the disclosed example.

Step S610: executing the encoding process to the plurality of display data. More specifically, the transporting device 20 executes the encoding process to the plurality of display data via the encoding module 2046. Preferably, the adjusting process is the data-format-transforming process, the compressing process or the encrypting process, but this specific example is not intended to limit the scope of the disclosed example.

Step S612: transporting the plurality of display data and the arrangement data to the receiving device 30. More specifically, the transporting device 20 transports the plurality of display data and the arrangement data to the receiving device 30 via the network connection.

Step S614: executing the decoding process to the plurality of display data. More specifically, the receiving device 30 executes the decoding process to the plurality of received display data via the decoding module 3020. Preferably, the decoding process is corresponded to the encoding process. The decoding process the decompressing process or the decrypting process, but this specific example is not intended to limit the scope of the disclosed example.

Step S616: merging the plurality of display data into the output display data. More specifically, the receiving device 30 merges the plurality of display data into the single output display data so as to make the plurality of display data be simultaneously displayed on the single display unit 42.

Step S618: transporting the output display data to the display unit 42. More specifically, the receiving device 30 transports the output display data to the display unit 42 for displaying via wire/wireless.

Step S620: determining whether the network connection is disconnected. More specifically, the transporting device 20 and/or the receiving device 30 determine(s) whether the network connection is disconnected, and finish(es) the display in a manner of mirror when determining the network connection is disconnected. If the transporting device 20 and/or the receiving device 30 determine(s) that the network connection is still connected, perform(s) a step S622.

Step S622: determining whether any content 2020 is changed. More specifically, the transporting device 20 determines whether at least one of the plurality of contents 2020 is changed. If the transporting device 20 determines that at least one of the plurality of contents 2020 is changed, repeatedly performs the step S602 for re-generating the display data corresponding to the screen of execution of the content(s) 2020. If the transporting device 20 determines that none of the contents 2020 is changed, repeatedly performs the step S620 for continuously detecting.

Via simultaneously transporting the screens of execution of the plurality of contents to the receiving device, and displaying it on the display unit of the receiving device, the present disclosed example allows the user to watch the current screens of execution of the contents of the transporting device via a single display unit.

The foregoing descriptions of embodiments of the disclosed example have been presented only for purposes of illustration and description. They are not intended to be exhaustive or to limit the disclosed example to the forms disclosed. Accordingly, many modifications and variations will be apparent to practitioners skilled in the art. Additionally, the above disclosure is not intended to limit the disclosed example. The scope of the disclosed example is defined by the appended.

What is claimed is:

1. A mirror display system, comprising:
    a transporting device, comprising:
        a transporting element;
        a memory element storing a plurality of contents;
        a human-machine interface, accepting an external operation for configuring an arrangement data, wherein the arrangement data comprises an expected display position and an expected display range of each display data in a display unit; and
        a processing element electrically connected to the transporting element and the memory element loading and transforming the plurality of contents into a plurality of display data, and transporting the plurality of display data and the arrangement data to outside via the transporting element, wherein the plurality of display data respectively corresponds to the screens of execution of the plurality of contents, at least one of the contents is executed at a top layer of the transporting device, at least one of the contents is executed in the background of the transporting device, the content executed at the top layer is displayed on a screen of the transporting device, and the content executed in the background is un-displayed on the screen of the transporting device; and
    a receiving device, comprising:
        a transporting unit, receiving the plurality of display data and the arrangement data;
        a processing unit electrically connected to the transporting unit, the processing unit configuring the expected display position and the expected display range of the arrangement data as a real display position and a real display range of each display data when determining that arranging the plurality of display data according to the arrangement data will not cause any error, and adjusting the real display position and the real display range when determining that arranging the plurality of display data according to the arrangement data will cause the error, the processing unit merging the plurality of display data into an output display data according to the real display position and the real display range, and transporting the output display data to the display unit for displaying.

2. The mirror display system according to claim 1, wherein the plurality of contents are computer files, computer programs or multimedia data streams.

3. The mirror display system according to claim 1, wherein the receiving device further comprises a shared image buffer electrically connected to the processing unit; the processing unit stores each display data in the different address of the shared image buffer for merging the plurality of display data into the output display data according to the real display position and the real display range of each display data.

4. The mirror display system according to claim 1, wherein the processing element comprises a drawing module, the processing element transforms the content into a display image as the display data corresponding to the content when determining that the drawing module doesn't support the content, and draws a view corresponding to the content via the drawing module when determining that the drawing module supports the content.

5. The mirror display system according to claim 4, wherein the transporting device further comprises a display element electrically connected to the processing element, the processing element captures a current displayed screen of the display element as the display data corresponding to the content when determining that the display element has displayed the view.

6. The mirror display system according to claim 5, wherein the processing element further comprises a format-determining module for determining whether the receiving device supports a data format of the content; the processing element directly makes the content itself as the display data when the display element doesn't display the view and the format-determining module determines that the receiving device supports the data format of the content, and makes the view as the display data corresponding to the content when the display element doesn't display the view and the format-determining module determines that the receiving device doesn't support the data format of the content.

7. The mirror display system according to claim 1, wherein the processing element comprises an adjusting module for adjusting a display range or a display scale of the plurality of display data.

8. The mirror display system according to claim 1, wherein the processing element comprises an encoding module for executing an encoding process to the plurality of display data; the processing unit comprises a decoding module for executing a decoding process to the plurality of display data.

9. The mirror display system according to claim 8, wherein the encoding process is a data-format-transforming process, a compressing process or an encrypting process; the decoding process is a decompressing process or a decrypting process.

10. A mirror display method being used in a mirror display system, the mirror display system comprising a transporting device and a receiving device, the mirror display method comprising following steps:
    a) establishing a network connection with the receiving device at the transporting device;
    b) loading a plurality of contents;
    c) transforming the plurality of contents into a plurality of display data, wherein the plurality of display data respectively corresponds to the screens of execution of the plurality of contents, at least one of the contents is executed at a top layer of the transporting device, at least one of the contents is executed in the background of the transporting device, the content executed at the top layer is displayed on a screen of the transporting device, the content executed in the background is un-displayed on the screen of the transporting device;

d) configuring an arrangement data, wherein the arrangement data comprises an expected display position and an expected display range of each display data in a display unit;

e) transporting the plurality of display data and the arrangement data to the receiving device via network;

f) configuring the expected display position and the expected display range of the arrangement data as a real display position and a real display range of each display data when determining that arranging the plurality of display data according to the arrangement data will not cause any error;

g) adjusting the real display position and the real display range when determining that arranging the plurality of display data according to the arrangement data will cause the error;

h) merging the plurality of display data into an output display data according to the real display position and the real display range at the receiving device; and i) transporting the output display data to the display unit for displaying.

11. The mirror display method according to claim 10, wherein the plurality of contents are computer files, computer programs or multimedia data streams.

12. The mirror display method according to claim 10, wherein the step h is to merge the plurality of display data into the output display data according to the real display position and the real display range of each display data.

13. The mirror display method according to claim 12, wherein the step h) is to store each display data in the different address of the shared image buffer for merging the plurality of display data into the output display data according to the real display position and the real display range of each display data.

14. The mirror display method according to claim 10, wherein the step c) comprises following steps:

c1) transforming the content into a display image as the display data corresponding to the content when determining that the transporting device doesn't support the content; and c2) drawing a corresponded view according to the content when determining that the transporting device supports the content.

15. The mirror display method according to claim 14, wherein the step c) further comprises step c3: capturing a current displayed screen of a display element as the display data corresponding to the content when determining that the display element has displayed the view.

16. The mirror display method according to claim 15, wherein the step c) further comprises following steps:

c4) determining whether the receiving device supports a data format of the content when the display element doesn't display the view;

c5) after the step c4), making the content itself as the display data when determining that the receiving device supports the data format of the content; and c6) after the step c4), making the view as the display data corresponding to the content when determining that the receiving device doesn't support the data format of the content.

17. The mirror display method according to claim 10, wherein the mirror display method comprises a step e1) before the step e): executing an adjusting process to the plurality of display data.

18. The mirror display method according to claim 10, wherein the mirror display method comprises a step e2) before the step e): executing an encoding process to the plurality of display data; the mirror display method comprises a step h1) before the step h: executing a decoding process to the plurality of display data.

19. The mirror display method according to claim 18, wherein the encoding process is a data-format-transforming process, a compressing process or an encrypting process; the decoding process is a decompressing process or a decrypting process.

20. The mirror display method according to claim 10, wherein the mirror display method further comprises a step i): re-performing the step b) to step i) when any content is changed.

* * * * *